June 7, 1932.  H. H. ROOT  1,861,939
COMB UNCAPPING APPARATUS
Filed Nov. 5, 1924
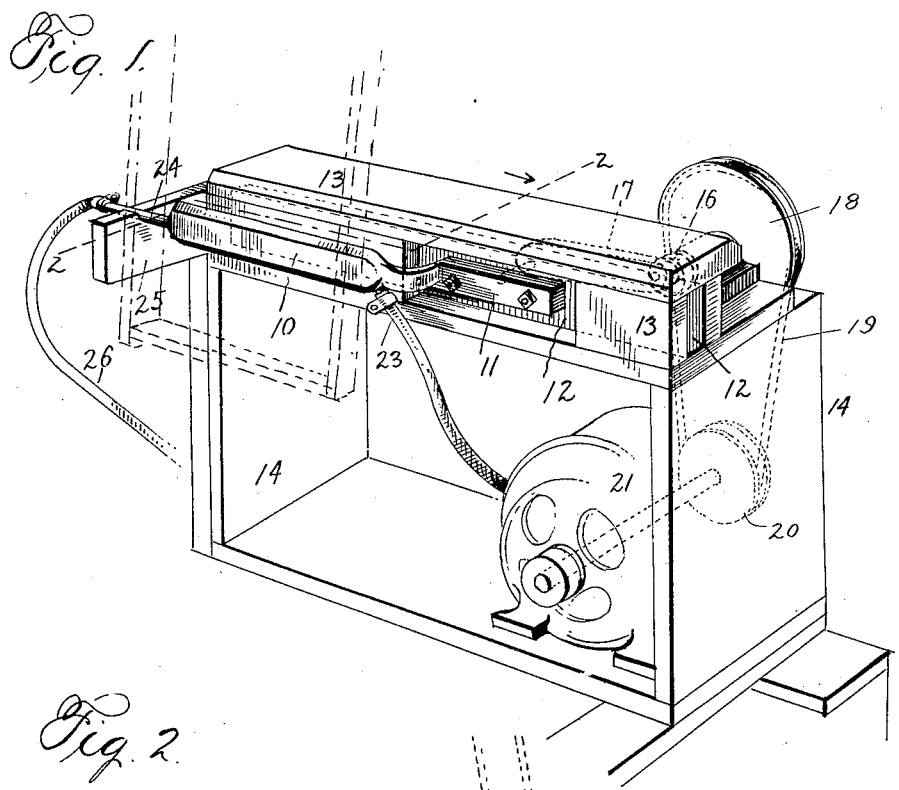
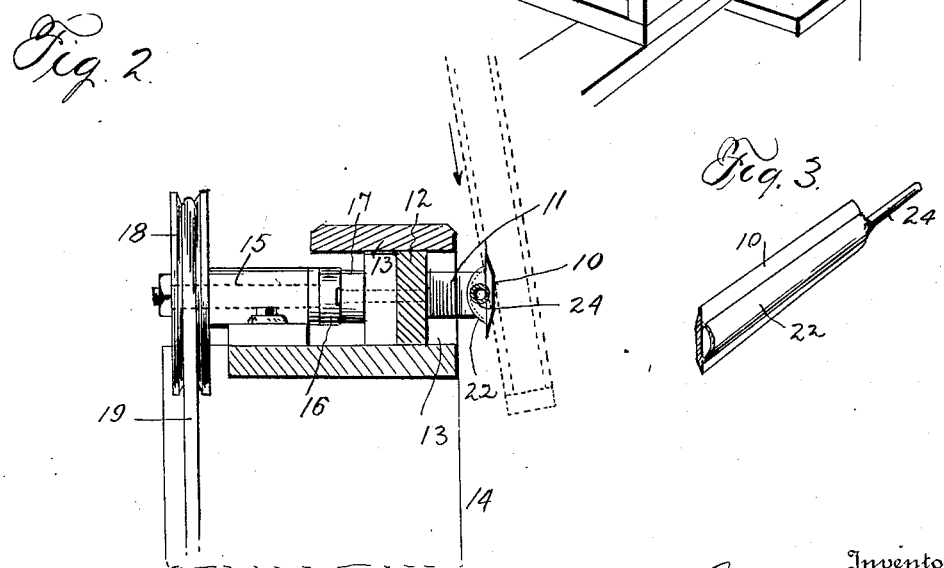
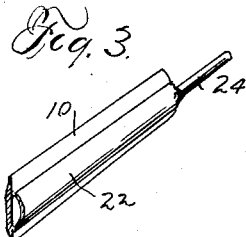

Patented June 7, 1932

1,861,939

UNITED STATES PATENT OFFICE

HUBER H. ROOT, OF MEDINA, OHIO, ASSIGNOR TO THE A. I. ROOT COMPANY, OF MEDINA, OHIO, A CORPORATION

COMB UNCAPPING APPARATUS

Application filed November 5, 1924. Serial No. 747,957.

My invention has to do with the removal of the caps from the filled cells of honey comb which is contained in rectangular frames, such removal being necessary for the extraction of the honey from the cells in which it is stored by the bees. The common practice is to employ a knife to slice off the cappings by hand manipulation, the frame containing the honey being held by one hand and the knife held in the other hand and moved over the face of the comb at a depth to slice off the sheet of cappings. The object of my invention generally stated is to provide a device which will diminish the labor required, will do the work with all required thoroughness and do it rapidly and thus besides saving labor or muscular efforts will save cost. In what I now regard as a most satisfactory embodiment of my invention a knife similar to that used in the hand work is reciprocated by power while being heated and the frame containing the honey comb is moved past the reciprocating knife so that the cutting edge thereof acts on the sheet of cappings at the desired depth below the face thereof to uncap or open the cells, but my invention consists in whatever is described by or is included within the terms or scope of the appended claims.

In the accompanying drawing:

Fig. 1 is a perspective view of a machine or device embodying my invention;

Fig. 2 is a view thereof in vertical section, on line 2—2 of Fig. 1;

Fig. 3 is a detail perspective view of a portion of the knife.

Describing in detail what is shown in the drawing the knife has a horizontal blade, 10, with an upper straight cutting edge of a length substantially the distance between the top and bottom bars of the comb frame and a shank on a handle, 11, at one end which is bolted or otherwise secured to a horizontal bar, 12, which is horizontally slidable in a guide, 13, on the top of a frame, 14, adapted to rest upon the top of a capping melter so that as the cappings are sliced off the comb they will fall into the melter. Upon the top of the frame near one end is a short transverse shaft, 15, having at the end near the bar to which the knife is attached a crank or eccentric, 16, which by a pitman, 17, is connected with said bar, and at the other end has a pulley, 18, which by a belt, 19, is drivingly connected with a pulley, 20, on the armature shaft of a small electric motor, 21, mounted in the frame and thus the reciprocation of the knife at a rapid rate of speed may be caused. It is highly important that the uncapping operation should not result in any mutilation of the comb, because the comb should be available for reuse; and it is important that the cutting operation result in no particles of wax or "sawdust" which mixing with the honey would be very objectionable in that it would clog the strainer through which the extracted honey is passed. By giving to the knife a rapid motion say about six hundred strokes a minute and short strokes say about one fourth of an inch the capping is rapidly cut, the comb is not mutilated and there is no sawdust. While the length and rate of the strokes mentioned are highly satisfactory in their results I, of course, do not limit myself thereto.

It is essential that the knife while in contact with the wax during a cutting operation shall be heated as a heated knife slices the cappings off more readily than a cold knife and the cappings as sliced off do not adhere to the blade. A cold knife would tear the fragile cells of the comb and the cappings and the honey would stick thereto. I therefore heat the knife preferably by means of steam which is circulated through a passage on the side of the knife away from that next the comb in cutting which passage may be formed by a strip, 22, of copper extending longitudinally of the blade and spaced therefrom between its upper and lower edges which are soldered to the blade. At the heel of the knife is an inlet to which is clamped one end of a flexible tube or hose, 23, that runs from a boiler or other source of supply of steam and at the other end of the knife is an outlet from the chamber consisting of a copper tube, 24, which extends horizontally at the center of the blade through a guide groove in a bracket, 25, of the frame and outside the latter has clamped to it a flexible tube or hose, 26, to lead off the steam after it passes through the knife passage or chamber. The outlet tube supporting bracket is spaced sufficiently from the end of the knife in its nearest approach to the bracket to allow the top bar of the comb frame to rest upon the tube and thereby to form a supporting guide for the frame when held in a more or less vertical position and allowed by its weight to move downward over the upper cutting edge of the knife. By rocking the frame on said tube as a bearing or fulcrum so as to change the angle of the frame of comb the place of contact of the cutting edge of the blade with the comb may be closely adjusted and the operator can cause the cut to be made just as deep or shallow as he desires, and may adjust the cutting according to the thickness of the particular comb to be uncapped. While the top bar of the frame thus engages and is guided by the steam outlet tube, the bottom bar of the frame which is thinner than the top bar rests against the outer face of the knife blade at the heel end. It is very seldom that the comb is thinner than the bottom bar but should it be thinner so that the thin portion adjacent the bottom bar would not be reached by the cutting edge of the knife when the frame passes over the latter with the top bar in contact with the steam outlet tube and the bottom bar in contact with the outer face of the blade, the portion of the comb next to the bottom bar not removed in that operation may afterwards be removed by using the heel of the knife.

By a bend in the shank at the heel of the knife the blade is offset or spaced sufficiently from the side of the frame guide to allow the sheet of capping to pass between the knife and said guide as the slicing operation proceeds.

It will be seen that the manual or physical labor involved in uncapping with a machine embodying my invention amounts practically to nothing more than using the hands to guide or hold the frame in position with reference to the cutting edge of the knife as ordinarily the weight of the comb is sufficient to furnish the pressure required to move the comb over the cutting edge of the knife.

I have already indicated some of the particulars in which changes may be made in what is shown in the drawing without departing from my invention. Other such changes may be made by those skilled in the art such for example as the use of some other means than an electric motor to supply the power to reciprocate the knife.

What I claim is:

1. A honey comb uncapping machine comprising a single movably supported knife a frame bar guide adapted to permit movement of the frame at selected angles at the will of the operator and means to cause movement of the knife while in contact with the comb in short reciprocations.

2. A honey comb uncapping knife having means for heating the same by the application of a heated fluid comprising a fluid passage at one end of the knife projecting therefrom and forming a frame bar guide the knife being hollow and having a fluid inlet.

3. A honey comb uncapping knife having a longitudinally extending chamber for a heating fluid, means for introducing such fluid into such chamber and a fluid outlet extending from one end of the knife and forming a frame bar support.

4. A honey comb uncapping machine comprising a single reciprocating knife having a horizontal cutting edge, power means to reciprocate said knife and means having a frame-engaging surface situated to engage the edges of the frame bars to guide a comb containing frame downward past the cutting edge of the knife said means permitting the frame to be presented at any one of several angles.

5. A honey comb uncapping machine comprising a reciprocating knife having a horizontal cutting edge, power means to reciprocate said knife and means to guide a comb containing frame downward past the cutting edge of the knife, and comprising a frame bar engaging surface of the knife.

6. A honey comb uncapping machine for uncapping comb in a frame comprising a knife blade having a horizontal upper cutting edge, means for reciprocating said blade horizontally and a tube for a knife heating fluid extending horizontally from said blade at one end and positioned to be engaged by the top bar of the frame.

7. A honey comb uncapping machine comprising a reciprocating knife having a horizontal upwardly exposed cutting edge, a support to one side of which said knife is located, a surface situated to engage the edge of one side of a honey comb frame, allowing the frame to rock to adjust the face of the comb at a desired angle to the cutting edge of the knife and to slide past the knife and means to cause reciprocation of the knife while in contact with the comb.

8. A honey comb uncapping machine comprising a movably supported knife and means to cause movement of the knife while in contact with the comb in short reciprocations, and means for heating the knife while in action.

9. A honey comb uncapping knife having means for heating the same by the application of a heated fluid including a tube projecting at one end of the knife, and adjacent the end of the knife being straight to form a support and guide for a comb frame bar and means to support said tube to one side of the place where it is engageable by said frame bar.

10. A honey comb uncapping device including a knife and means for heating the same by the application of a heated fluid including a tube projecting at one end of the knife, and adjacent the end of the knife being straight to form a support and guide for a comb frame bar, and a support for said tube beyond the portion that is engaged by the frame bar on which said tube may reciprocate, and means for reciprocating the knife and tube.

In testimony whereof I hereunto affix my signature.

HUBER H. ROOT.